US012129694B2

(12) United States Patent
Cho

(10) Patent No.: US 12,129,694 B2
(45) Date of Patent: Oct. 29, 2024

(54) LATCH APPARATUS FOR DOOR OF VEHICLE

(71) Applicants: HYUNDAI MOTOR COMPANY, Seoul (KR); KIA CORPORATION, Seoul (KR)

(72) Inventor: Kuk Hyun Cho, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 213 days.

(21) Appl. No.: 17/883,768

(22) Filed: Aug. 9, 2022

(65) Prior Publication Data

US 2023/0071951 A1 Mar. 9, 2023

(30) Foreign Application Priority Data

Sep. 6, 2021 (KR) ........................ 10-2021-0118090

(51) Int. Cl.
*E05B 85/24* (2014.01)

(52) U.S. Cl.
CPC .................................. *E05B 85/243* (2013.01)

(58) Field of Classification Search
CPC ..................................................... E05B 85/243
See application file for complete search history.

(56) References Cited

U.S. PATENT DOCUMENTS 4,073,519 A * 2/1978 Kurozu ................. E05B 85/243 292/216
4,775,176 A * 10/1988 Ikeda .................... E05B 85/243 292/216
4,880,263 A * 11/1989 Yamada .................. E05B 81/66 292/201
5,046,341 A * 9/1991 Ogino ................... E05B 85/243 292/216
5,454,608 A * 10/1995 Dzurko ................... E05B 81/16 292/216
5,803,515 A * 9/1998 Arabia, Jr. .............. E05B 81/16 292/201
6,367,296 B1 * 4/2002 Dupont ................... E05B 81/16 292/201
6,733,052 B2 * 5/2004 Perkins ................... E05B 81/16 292/216
7,080,861 B2 * 7/2006 Watanabe ............... E05B 83/36 292/216
7,543,861 B2 * 6/2009 Dupont ................. E05B 85/243 292/216
9,255,429 B2 * 2/2016 Kim ........................ E05B 83/24
2014/0319852 A1 * 10/2014 Shimura ................. E05B 85/02 292/216
2015/0167357 A1 * 6/2015 Nam ....................... E05B 77/06 292/200

* cited by examiner

*Primary Examiner* — Mark A Williams
(74) *Attorney, Agent, or Firm* — Morgan, Lewis & Bockius LLP

(57) ABSTRACT

A latch apparatus for a door of a vehicle is proposed. The latch apparatus includes a claw lever restrained by a pawl lever to lock a striker as the door is operated in a closed state, and released from the pawl lever to unlock the striker as the door is operated in an open state, and an elastic member configured to adjust an elastic force provided to the claw lever, as the claw lever is rotated in a state where a first end of the elastic member is movably inserted into a slot in the claw lever.

10 Claims, 13 Drawing Sheets

LATCH APPARATUS FOR DOOR OF VEHICLE

CROSS REFERENCE TO RELATED APPLICATION

The present application claims priority to Korean Patent Application No. 10-2021-0118090, filed Sep. 6, 2021, the entire contents of which are incorporated herein for all purposes by this reference.

TECHNICAL FIELD

The present disclosure relates to a latch apparatus for a door of a vehicle. More particularly, the present disclosure relates to a latch apparatus for a door of a vehicle, in which a two-way torsional spring is applied to a claw lever to increase resistance to a latch and a striker when a door is opened, and to reduce resistance when the door is closed, thus improving door closing performance, increasing an elastic force acting in an initial opening stage of the door, and thereby reducing a door opening sound.

BACKGROUND

Generally, an outside handle is mounted on an outside of a door of a vehicle to open or close the door, an inside handle is mounted on an inside of the door, and a door latch assembly is mounted on an inside of a door panel to be coupled to a striker secured to a vehicle body and thereby perform a locking or unlocking operation.

Therefore, when a user operates an open button, such as a remote control or a key, to open the door, a solenoid of a door latch assembly that receives a signal from the remote control is operated in a door opening direction to unlock a door latch. Subsequently, when the user pulls the door outside handle in the opening direction, the door is opened. Here, the door latch assembly generally includes a pawl lever that is rotated in the door opening direction in a door lock state, and a claw lever that is restrained by the pawl lever to lock the striker when the door is closed and is released from the pawl lever to unlock the striker when the door is opened.

Furthermore, a first catch protrusion and a second catch protrusion are formed on the claw lever so that the claw lever restraining the striker forms a two-stage restraint state in conjunction with the pawl lever.

Therefore, if the striker enters a groove in the claw lever, the claw lever rotates in one direction. At this time, the first catch protrusion of the claw lever is caught by the pawl lever to make a first stage restraint state.

Subsequently, when the claw lever is pushed by the striker to be completely rotated, the second catch protrusion of the claw lever is caught by the pawl lever to make a second stage restraint state.

In contrast, if a releasing force is transmitted to the pawl lever to move the claw lever from the lock position, where the claw lever is in the second stage restraint state, to the unlock position, the pawl lever is separated from the claw lever.

Eventually, if the pawl lever receiving an operating force is separated from the claw lever, the claw lever is rotated in a separation direction when an opening force is applied to the door, thus putting the striker into a state in which it may be separated from the claw lever.

As such, factors related to the opening and closing of the door in the door latch assembly may be classified into three forces, for instance, a weather-strip repulsive force that is applied in a door opening direction to increase an opening speed when the door is opened because the weather strip is a rubber material having elasticity to have the function of blocking the inside and outside of the vehicle, a claw-lever rotating force that is always applied in the opening direction by a spring to interfere with the closing operation and increase the opening speed, and a user's opening force.

Furthermore, the door closing exclusively depends on a user's force, whereas the door opening is affected by a user's opening force, the weather-strip repulsive force, and the rotating force of the claw lever. Thus, when the door is opened, the claw lever and the striker are instantaneously separated by a larger force.

In other words, in the door latch assembly, it is difficult to close the door because all operating mechanisms except for a user's force apply a force in the door opening direction. In addition, the opening sound may be increased when the door is opened.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a latch apparatus for a door of a vehicle, in which, when a two-way torsional spring is applied to a claw lever to increase resistance to a latch and a striker when a door is opened, and to reduce resistance when the door is closed, a first end of the torsional spring can move leftwards and rightwards in a slot of the claw lever, and can be elastically moved along a movement guide provided in the latch to adjust the elastic force of the torsional spring, thus increasing an elastic force acting in a direction opposite to the rotating direction of the claw lever in an initial opening stage of the door, and thereby reducing a door opening sound.

In order to achieve the objective of the present disclosure, the present disclosure provides a latch apparatus for a door of a vehicle, the latch apparatus including a claw lever restrained by a pawl lever to lock a striker as the door is operated in a closed state, and released from the pawl lever to unlock the striker as the door is operated in an open state; and an elastic member configured to adjust an elastic force provided to the claw lever, as the claw lever is rotated in a state where a first end of the elastic member is movably inserted into a slot in the claw lever.

The elastic member may provide an additional elastic force in a direction opposite to a rotating direction of the claw lever, as the door is switched from the closed state to the open state.

The elastic member may adjust intensity of the elastic force through rotation of the claw lever in a state where a second end of the elastic member is secured to a latch body to be spaced apart from the claw lever.

The elastic member may be configured to operate such that the first end thereof inserted into the slot moves from a first position to a second position as the claw lever is rotated to lock the striker, and the first end thereof moves from the second position to the first position as the claw lever is rotated to unlock the striker.

The latch apparatus may further include a movement guide provided on the latch body to guide a moving path of the elastic member inserted therein. The movement guide may include a first moving path configured to guide the elastic member to a maximum compression position, as the claw lever is rotated to lock or unlock the striker; and a second moving path extending from the first moving path to define a circulation path, and guiding the first end of the elastic member from the first position to the second position when the claw lever rotates.

The elastic member may be configured to provide an elastic restoring force, in a direction where the claw lever is rotated, to the claw lever, when the first end of the elastic member is at the first zone of the second moving path as the striker is locked. The elastic member may be configured to provide an additional elastic force to the claw lever, when the first end of the elastic member moves to a second zone bent of the second moving path as the striker is switched from a second stage lock state to an unlock state. The elastic member may be configured to provide an elastic restoring force, in the direction where the claw lever is rotated toward an initial position, to the claw lever, when the first end of the elastic member moves to a third zone of the second moving path extending from the second zone to arrive at the maximum compression position as the striker is switched to the unlock state.

The first moving path may guide the movement of the elastic member to the maximum compression position in a direction where the door is closed when the striker is locked, and may guide the movement of the elastic member to the maximum compression position in a direction where the door is opened from a point at an end of the third zone when the striker is unlocked.

The elastic member may provide the elastic force in the rotating direction of the claw lever at the maximum compression position when the striker is locked to cause the door to be in a first stage lock state, and may continuously provide an elastic force in a direction where the door is closed to cause the door to be in the second stage lock state, as the elastic member leaves the maximum compression position of the first stage lock state.

The elastic member may provide the elastic force in the rotating direction of the claw lever when the striker is unlocked to cause the door to be switched from the second stage lock state to a first stage lock state, and may continuously provide an elastic force in the direction where the door is opened, as the elastic member leaves the maximum compression position of the first stage lock state.

The elastic member may provide an elastic force in the direction where the door is closed when entering the first zone, and may provide an elastic force in the direction where the door is opened when the elastic member moves to an end of the third zone.

The latch apparatus may further include a stopper selectively compressed by a central portion of the elastic member that moves downwards, as the first end of the elastic member is moved to the second position and passes through the second zone when the striker is unlocked.

The stopper may include a material having elasticity to be compressed or released when being pressed by the central portion of the elastic member.

The present disclosure is advantageous in that, when a two-way torsional spring is applied to a claw lever to increase resistance to a latch and a striker when a door is opened, and to reduce resistance when the door is closed, a first end of the torsional spring can move leftwards and rightwards in a slot of the claw lever and can be elastically moved along a movement guide provided in the latch to adjust the elastic force of the torsional spring, thus increasing an elastic force acting in a direction opposite to the rotating direction of the claw lever in an initial opening stage of the door, and thereby reducing a door opening sound.

Further, the present disclosure is advantageous in that it is provided with a torsional spring and a stopper made of a material such as rubber to support the torsional spring, and the stopper is compressed as the position of the torsional spring is changed in an initial opening stage of a door, so resistance is increased by the rotation of the claw lever, thus suppressing a force for rotating the claw lever to unlock a striker with a stronger force.

BRIEF DESCRIPTION OF THE DRAWINGS

The above and other objectives, features, and other advantages of the present disclosure will be more clearly understood from the following detailed description when taken in conjoint with the accompanying drawings, in which.

DETAILED DESCRIPTION

Hereinafter, preferred embodiments of the present disclosure will be described in detail with reference to the accompanying drawings.

The advantages, features, and effects of the present disclosure will be more clearly understood from the following detailed description with reference to the accompanying drawings.

The present disclosure may be embodied in many different forms and should not be construed as being limited to only the embodiments set forth herein. Embodiments of the present disclosure will be provided to enable those skilled in the art more fully understand the present disclosure.

Further, when it is determined that the detailed description of the known art related to the present disclosure may obscure the gist of the present disclosure, the detailed description will be omitted.

Figure 1:
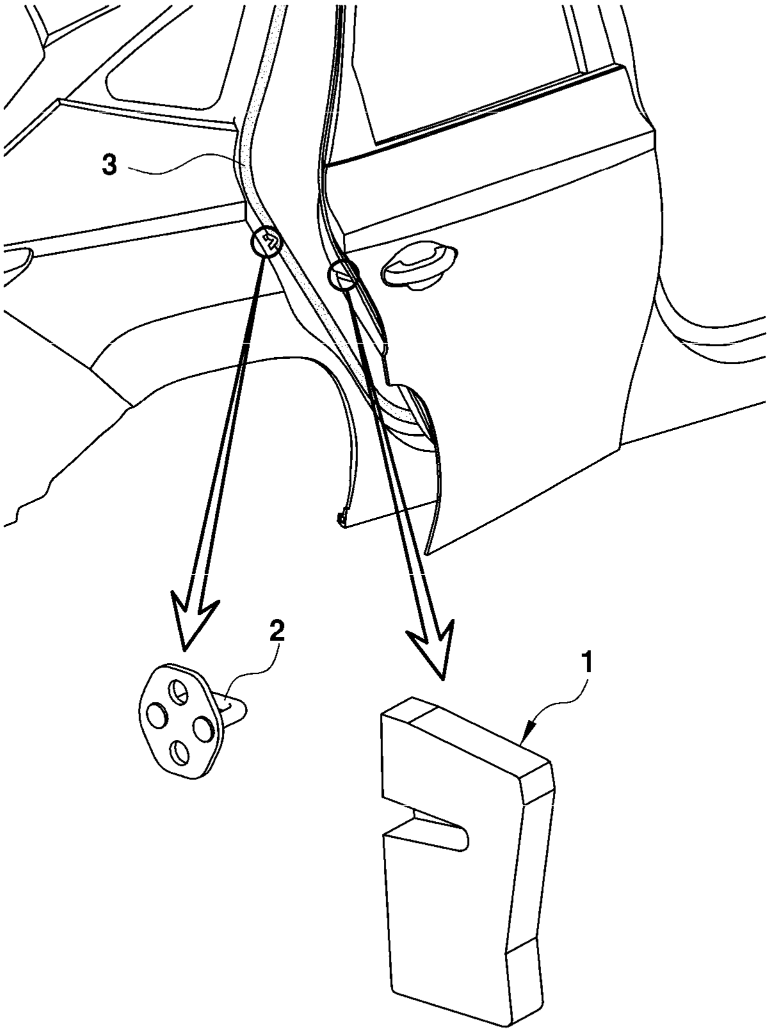
FIG. 1 is a diagram illustrating a coupling relationship between a latch body and a striker of a latch apparatus for a door of a vehicle in accordance with an embodiment of the present disclosure.
Figure 2A:
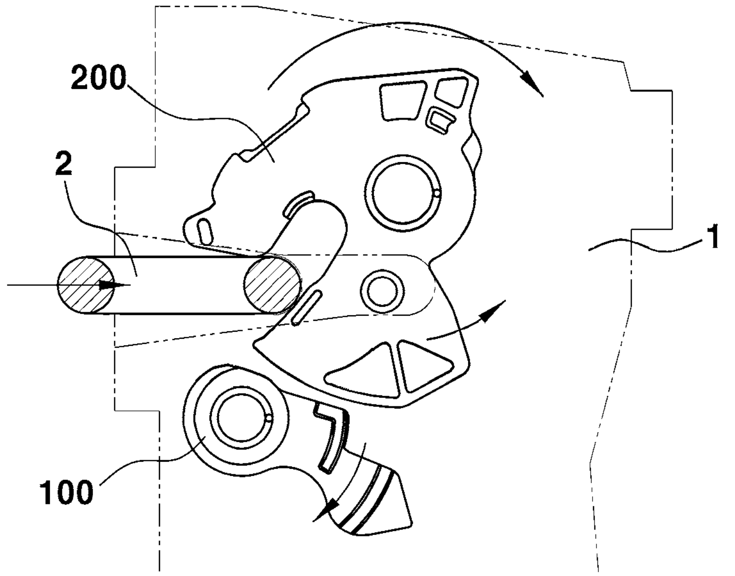
FIG. 2A (PRIOR ART)
FIGS. 2A to 2C are diagrams illustrating problems occurring in the related art as compared with the latch apparatus for the door of the vehicle in accordance with an embodiment of the present disclosure.
Figure 2B:
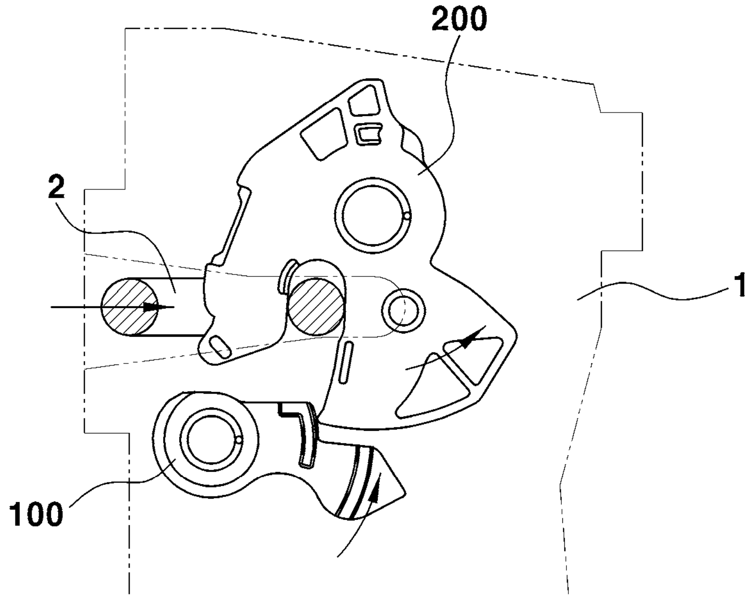
FIG. 2B (PRIOR ART)
Figure 2C:
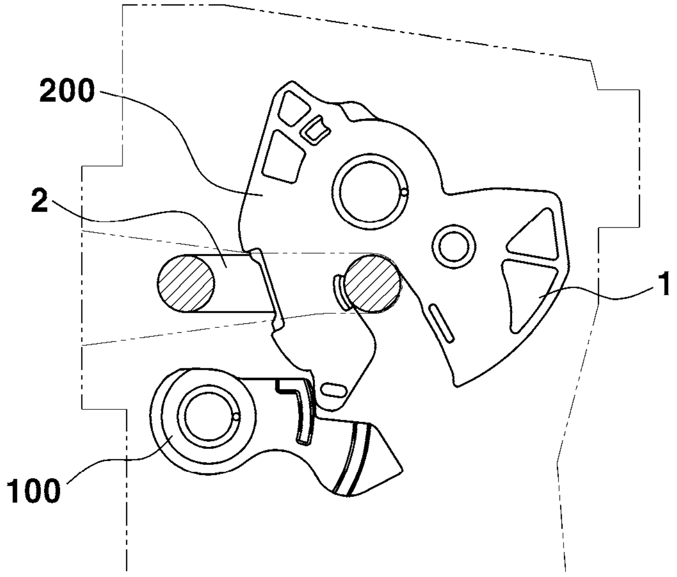
FIG. 2C (PRIOR ART)
Figure 3A:
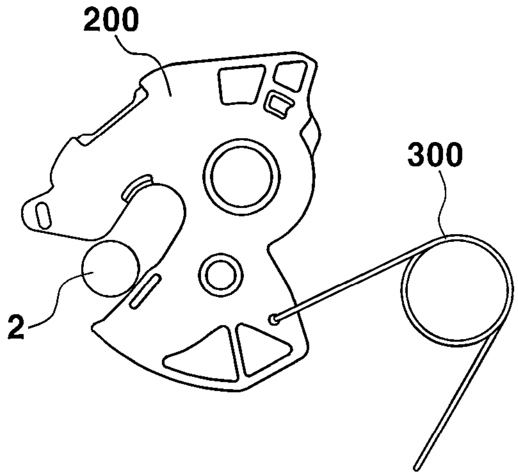
FIG. 3A (PRIOR ART)
FIGS. 3A to 3D are diagrams illustrating a conventional structure as compared with the latch apparatus for the door of the vehicle in accordance with an embodiment of the present disclosure.
Figure 3B:
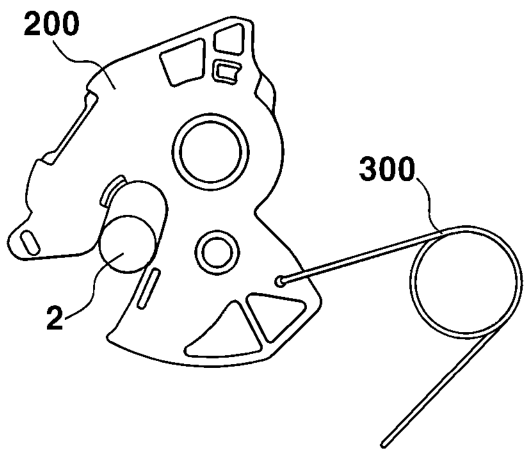
FIG. 3B (PRIOR ART)
Figure 3C:
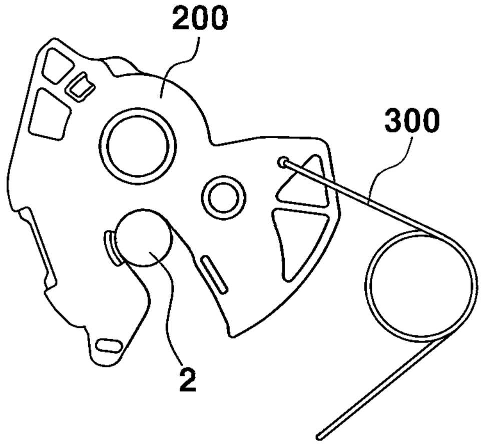
FIG. 3C (PRIOR ART)
Figure 3D:
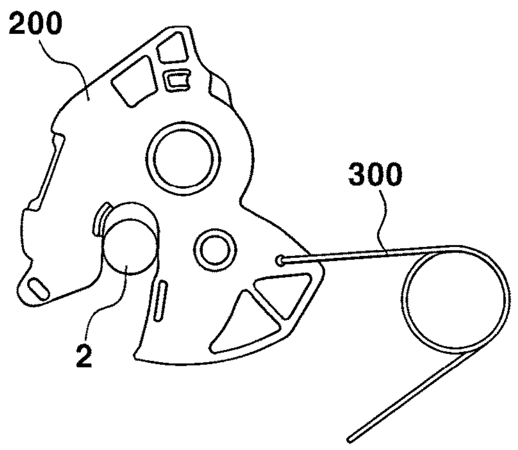
FIG. 3D (PRIOR ART)
Figure 4:
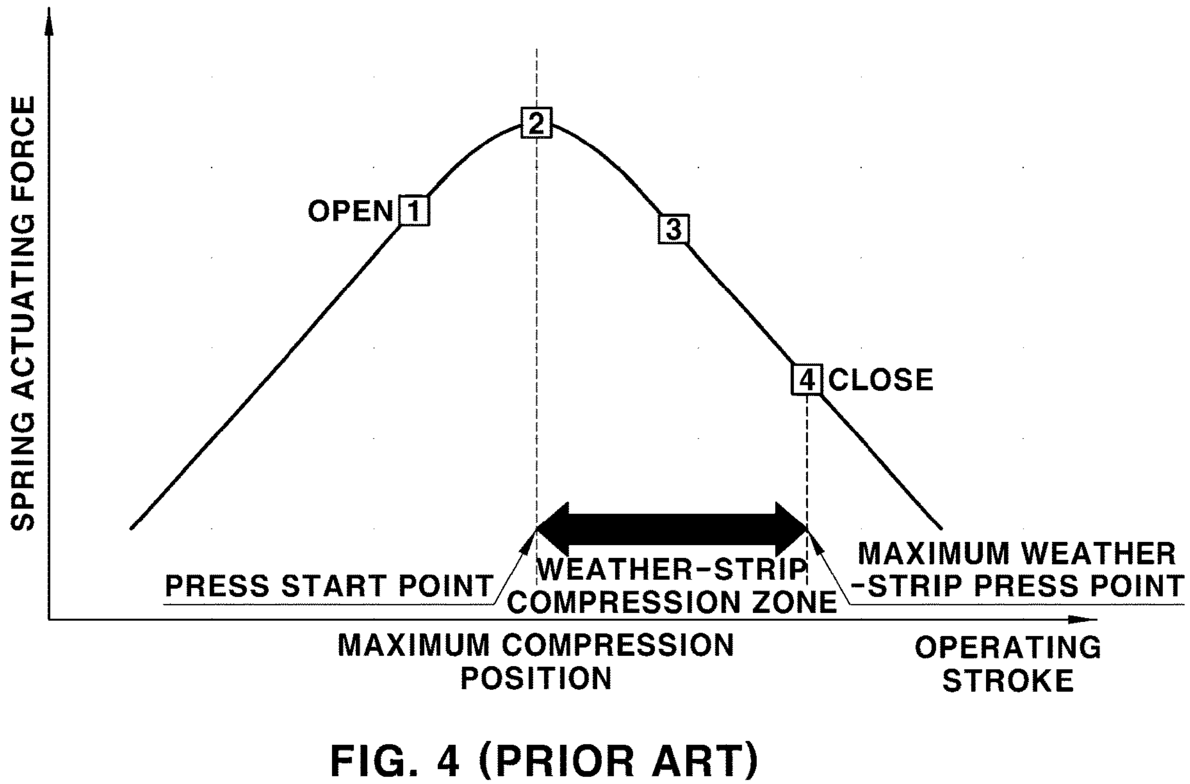
FIG. 4 (PRIOR ART)
FIG. 4 is a diagram illustrating an operating state in the conventional structure as compared with the latch apparatus for the door of the vehicle in accordance with an embodiment of the present disclosure.

FIG. 1 is a diagram illustrating a coupling relationship between a latch body and a striker of a latch apparatus for a door of a vehicle in accordance with an embodiment of the present disclosure, FIGS. 2A to 2C are diagrams illustrating problems occurring in the related art as compared with the latch apparatus for the door of the vehicle in accordance with an embodiment of the present disclosure, FIGS. 3A to 3D are diagrams illustrating a conventional structure as compared with the latch apparatus for the door of the vehicle in accordance with an embodiment of the present disclosure, and FIG. 4 is a diagram illustrating an operating state in the conventional structure as compared with the latch apparatus for the door of the vehicle in accordance with an embodiment of the present disclosure.

Figure 5:
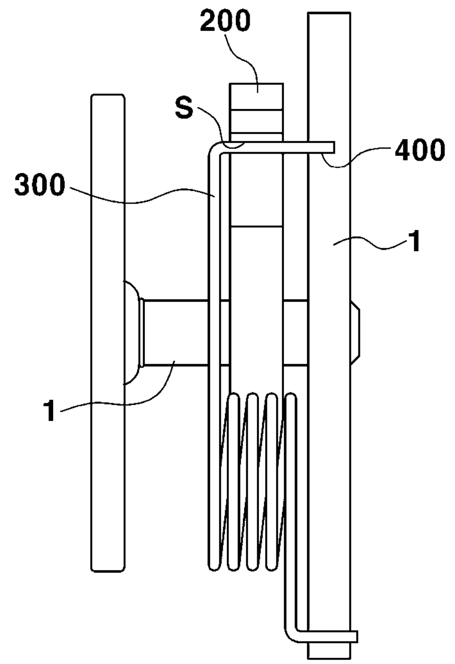
FIG. 5 is a diagram illustrating a coupling structure of the latch apparatus for the door of the vehicle in accordance with an embodiment of the present disclosure.
Figure 6:
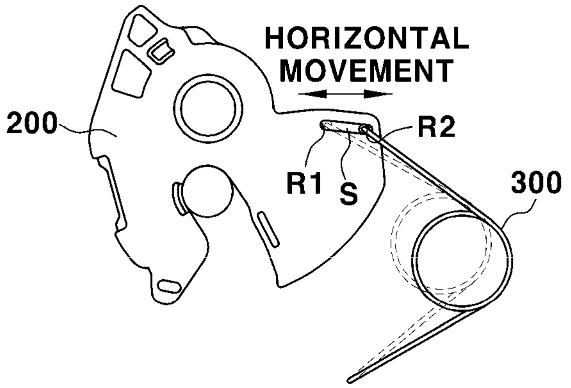
FIG. 6 is a diagram illustrating a horizontal movement of an elastic member in the latch apparatus for the door of the vehicle in accordance with an embodiment of the present disclosure.
Figure 7A:
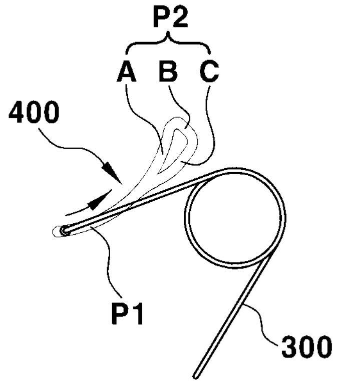
FIGS. 7A to 7D are diagrams illustrating a movement of the elastic member on a movement guide in the latch apparatus for the door of the vehicle in accordance with an embodiment of the present disclosure.
Figure 7B:
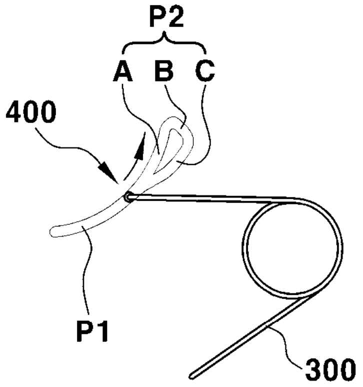
Figure 7C:
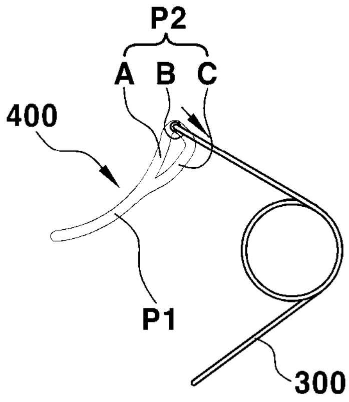
Figure 7D:
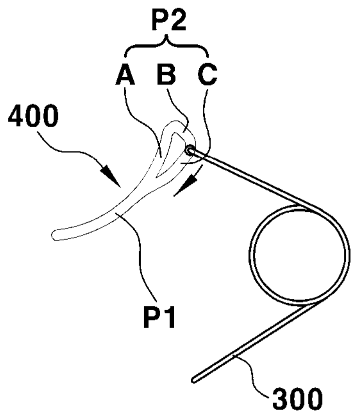

Further, FIG. 5 is a diagram illustrating a coupling structure of the latch apparatus for the door of the vehicle in accordance with an embodiment of the present disclosure, FIG. 6 is a diagram illustrating a horizontal movement of an elastic member in the latch apparatus for the door of the vehicle in accordance with an embodiment of the present disclosure, and FIGS. 7A to 7D are diagrams illustrating a movement of the elastic member on a movement guide in the latch apparatus for the door of the vehicle in accordance with an embodiment of the present disclosure.

Furthermore, FIGS. 8A to 8D are diagrams illustrating an operation of the elastic member when the door is opened in the latch apparatus for the door of the vehicle in accordance with an embodiment of the present disclosure, and FIGS. 9A to 9D are diagrams illustrating the operation of the elastic member when the door is closed in the latch apparatus for the door of the vehicle in accordance with an embodiment of the present disclosure.

Figure 10:
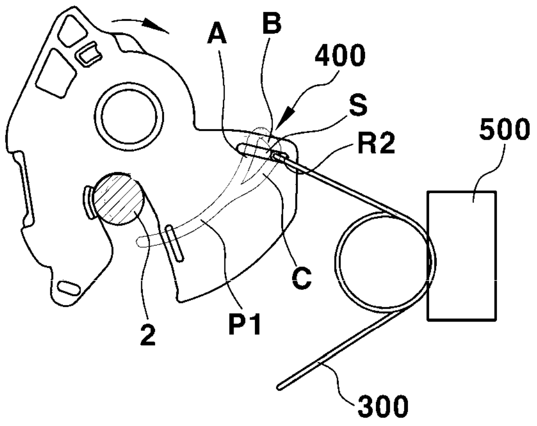
FIG. 10 is a diagram illustrating a stopper in the latch apparatus for the door of the vehicle in accordance with an embodiment of the present disclosure.
Figure 11:
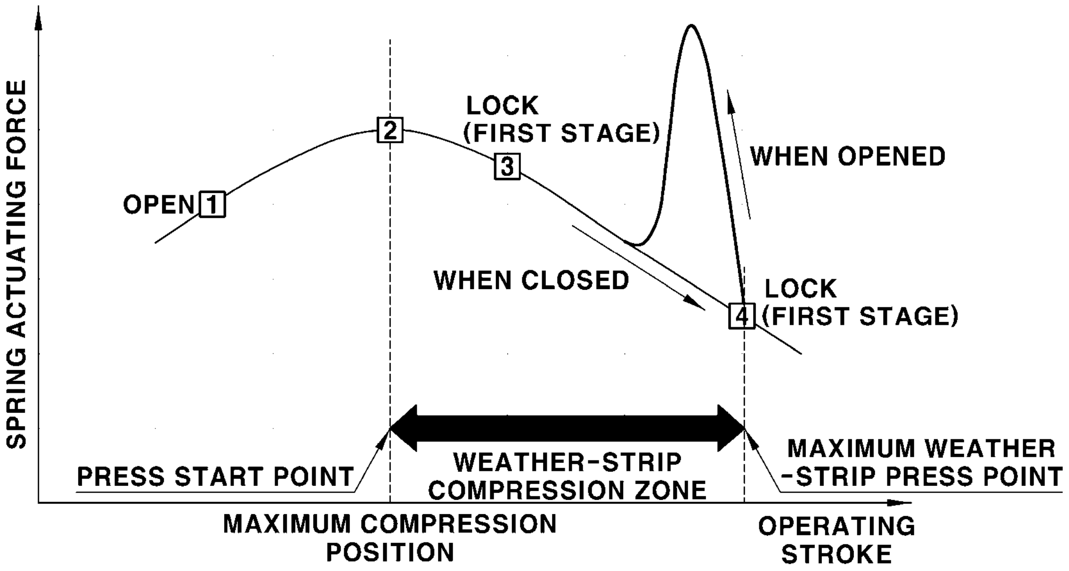
FIG. 11 is a diagram illustrating an operation state in a structure including the stopper in the latch apparatus for the door of the vehicle in accordance with an embodiment of the present disclosure.

FIG. 10 is a diagram illustrating a stopper in the latch apparatus for the door of the vehicle in accordance with an embodiment of the present disclosure, and FIG. 11 is a diagram illustrating an operation state in a structure including the stopper in the latch apparatus for the door of the vehicle in accordance with an embodiment of the present disclosure.

Generally, as shown in FIG. 1, a latch body 1 is mounted on an inside of a door to open and close the door, and a striker 2 is secured to a vehicle body to keep the latch body 1 closed. Further, a weather strip 3 serves to attenuate impact when the door is closed, and to block the inflow of air and noise between the inside and outside of the door.

A pawl lever 100 and a claw lever 200 are provided in the latch body 1. The pawl lever 100 is connected to an outside handle of the door to be rotated in a door opening direction. The claw lever 200 is restrained by the pawl lever 100 to lock the striker 2 as the door is operated in a closed state, and is released from the pawl lever 100 to unlock the striker 2 as the door is operated in an open state.

Thus, when the latch body 1 enters the striker 2 by a force that closes the door, the claw lever 200 rotates to reach a first stage lock state (see FIG. 2B) in a state where elasticity is provided in a direction opposite to a direction in which the claw lever 200 rotates (see FIG. 2A). At this time, the pawl lever 100 engages with the claw lever 200 so that it is not released.

Of course, in such a state, the door is not completely closed. In order to maintain the door in a completely closed state, the claw lever should be rotated by a larger force to reach a second stage lock state (see FIG. 2C).

In the case of a conventional structure, all operating mechanisms except for a user's force apply a force in the door opening direction. In other words, the door closing depends on only the user's force, but the door opening is performed by the user's opening force, the reaction force of the weather strip 3 made of an elastic material, and the rotating force of the claw lever 200. Thus, to open the door, all of the above-described forces are simultaneously applied, so the latch body 1 is instantaneously separated from the striker 3, thus causing a relatively loud opening sound.

In detail, as the door is opened in a state where the claw lever 200 is caught and fixed by the pawl lever 100 (2 stage lock), the latch body 1 is separated from the door. Then, the claw lever 200 rapidly applies the rotating force in the opening direction by a spring. While the striker 2 is instantaneously separated from the claw lever 200 by this rotating force, a strong contact pressure is applied between the claw lever 200 and the striker 2 having a small contact area. Thus, if the door is switched to the open state, a relatively loud opening sound is generated while the contact pressure is lost.

Therefore, in order to reduce the opening sound, resistance between the striker 2 and the claw lever 200 should be increased so that the door is slowly rotated when it is opened. In contrast, the resistance should be reduced to easily close the door.

To this end, conventionally, the elastic force is selectively applied in opposite directions by applying an elastic member 300 made of a torsional spring. Thus, the elastic member may assist the rotation of the claw lever 200 when the door is opened or closed, thus improving opening and closing performance.

For example, to close the door, the elastic member 300 reaches a maximum compression position as shown in FIGS. 3A and 3B, and then the elastic force is applied in the closing direction. Thereby, the latch apparatus is sequentially rotated along the first stage lock position and the second stage lock position as shown in FIGS. 3C and 3D, so the door closing performance may be improved due to a reduction in resistance.

However, if such a conventional structure rotates only to first and second stages shown in FIG. 4, the elastic force of the elastic member 300 exceeding the reaction force acting in a weather-strip compression zone is applied. After passing through the maximum compression position of the elastic member 300, a distance between the first and second ends of the elastic member 300 made of the torsional spring is increased and the actuating force of the elastic member 300 is reduced, so the door closing performance is improved.

However, when the door is opened, the actuating force of the elastic member 300 is the lowest in the closed state of the door (2-stage lock), i.e. in the fourth stage (see FIG. 3D). Thus, in the initial opening stage of the door, a force for providing resistance to the rotation of the claw lever 200 may not be transmitted. Thereby, the resistance is low when the door is opened, so the claw lever 200 may be inevitably rapidly rotated. As a result, the opening sound may not be reduced.

Therefore, the elastic member 300 according to this embodiment may be configured such that the first end thereof moves along the movement guide 400 provided on the latch body 1, as the claw lever 200 is rotated in a state where the first end thereof is movably inserted into a slot S formed in the claw lever 200, thus adjusting the elastic force provided to the claw lever 200.

That is, in a state where the second end of the elastic member 300 is secured to the latch body 1 to be spaced apart from the claw lever 200, as shown in FIG. 5, the first end thereof is mounted on the movement guide 400 through the slot S. When the claw lever 200 rotates, the first end thereof moves along the slot S and the movement guide 400, thus adjusting the intensity of the elastic force.

Preferably, as the claw lever 200 is released from the pawl lever 100 to switch the door from the closed state to the open state, the first end of the elastic member 300 moves in the slot S in the direction shown by the arrow of FIG. 6, and simultaneously is sequentially moves along a first moving path P1 and a second moving path P2 of the movement guide 400 as shown in FIGS. 7A to 7D. Thus, the elastic member 300 may provide additional elastic force in a direction opposite to the rotating direction of the claw lever 200, so resistance may be provided to the claw lever 200 by the additional elastic force when the door is opened. Consequently, it is possible to physically reduce speed at which the claw lever 200 is separated from the striker 2, thus reducing the opening sound in the initial opening stage of the door.

Referring to FIGS. 6, 7A to 7D, as the claw lever 200 is rotated to lock the striker 2, the first end of the elastic member 300 inserted into the slot S moves from a first position R1 to a second position R2 of the slot S.

Furthermore, as the claw lever 200 is rotated to unlock the striker 2, the first end of the elastic member 300 moves from the second position R2 to the first position R1 of the slot S. Such a slot S allows the first end of the elastic member 300 entering the second moving path P2 of the movement guide 400 to move along the second moving path P2. In other words, when the claw lever 200 rotates, the slot guides the elastic member 300 downwards (see FIG. 10), thus providing an additional elastic force for the elastic member 300.

The rotation of the claw lever 200 as the door opens or closes, and the movement of the first end of the elastic member 300 by the rotation of the claw lever 200 will be sequentially described below with reference to FIGS. 8A to 8D and FIGS. 9A to 9D.

In the initial position (FIG. 8A) for locking the striker 2, the first end of the elastic member 300 is located at the first position R1 of the slot S, a first side of the first path P1. If the claw lever 200 is rotated to perform a first stage locking operation, the elastic member 300 passes through the maximum compression position, and the claw lever is caught by the pawl lever 100 in the first stage lock position.

Here, after the elastic member 300 passes through the maximum compression position, the elastic force is applied in a direction where the claw lever 200 rotates, thus facilitating the rotation of the claw lever 200 for the first stage lock.

Figure 8A:
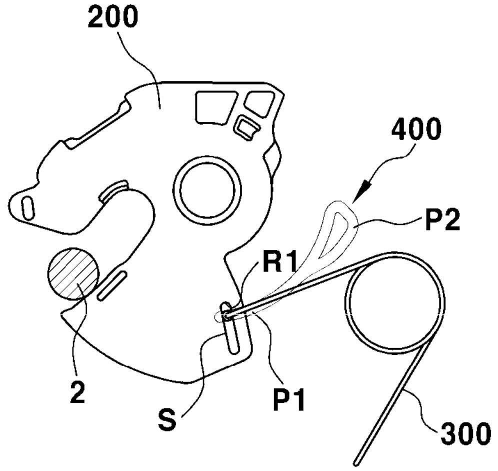
FIGS. 8A to 8D are diagrams illustrating an operation of the elastic member when the door is opened in the latch apparatus for the door of the vehicle in accordance with an embodiment of the present disclosure.
Figure 8B:
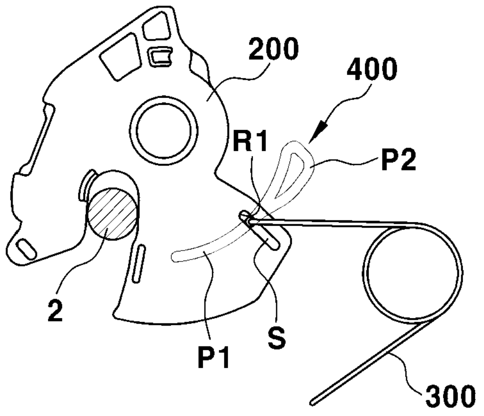
Figure 8C:
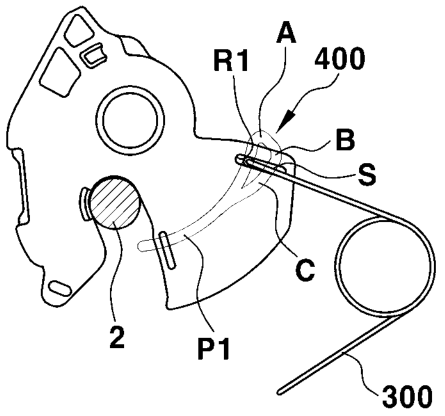
Figure 8D:
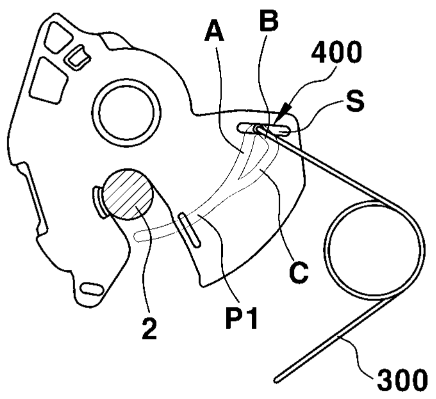

Thereafter, in the first stage lock state (FIG. 8B), the first end of the elastic member 300 is moved along the first moving path P2 by a predetermined inclination with respect to the first moving path P1. If a larger elastic force of the elastic member 300 is applied, the claw lever 200 is rotated, so the first end of the elastic member 300 enters a first zone A of the second moving path P2 for the second stage lock as shown in FIG. 8C, and the claw lever is caught by the pawl lever 100 to make the second stage lock (FIG. 8D).

Here, the second moving path P2 may be divided into a first zone A, a second zone B, and a third zone C to define a circulation path.

Such a first zone A is set as a zone which provides an elastic restoring force, in a direction where the claw lever 200 is rotated, to the first end of the elastic member 300 when the striker 2 is locked. The second zone B is set as a zone which is bent from the first zone A and moves the first end of the elastic member 300 as the striker 2 is switched from the second stage lock state to the unlock state, thus providing an additional elastic force to the elastic member 300. The third zone C is set as a zone which extends from the second zone B to be connected to the first moving path P1, guides the movement of the first end of the elastic member 300 to the maximum compression position when the striker 2 is switched to the unlock state, and provides the elastic restoring force in a direction where the claw lever 200 is rotated toward the initial position.

Figure 9A:
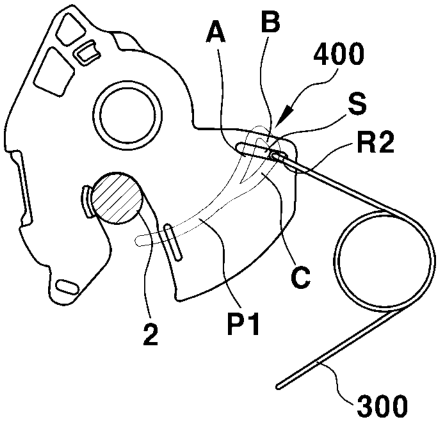
FIGS. 9A to 9D are diagrams illustrating the operation of the elastic member when the door is closed in the latch apparatus for the door of the vehicle in accordance with an embodiment of the present disclosure.

If the striker 2 is switched to the unlock state to open the door, as shown in FIG. 9A, by the second moving path P2 that is set as such, the claw lever 200 rotates, so the first end of the elastic member 300 is moved towards the second position R2 of the slot S, and simultaneously is moved along the second zone B.

Thus, the first end of the elastic member 300 moves as described above, so the elastic member is moved downwards, i.e. is compressed, and thereby a strong elastic force is provided to the claw lever 200. Consequently, when the striker 2 is switched to the unlock state, the actuating force of the elastic member 300 is increased, thus providing strong resistance in the initial opening stage of the door, and reducing an opening sound.

Figure 9B:
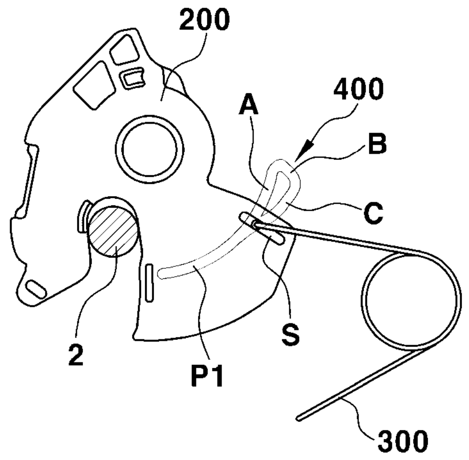
Figure 9C:
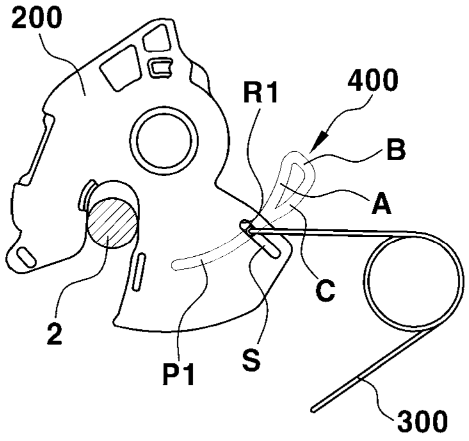
Figure 9D:
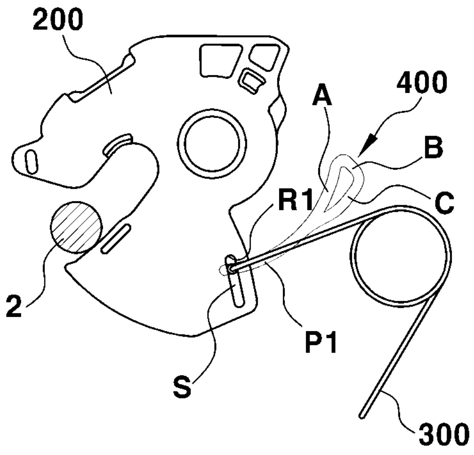

As such, when the striker 2 is switched to the unlock state, the actuating force of the elastic member 300 is increased, and then the first end of the elastic member 300 moves to the third zone C and the first position R1 of the slot S until the first stage lock is released as shown in FIGS. 9B and 9C, thus providing the elastic force in a direction opposite to the rotating direction of the claw lever 200. Further, after the elastic member passes through the maximum compression position, the elastic member 300 provides the elastic force in the same direction as the rotating direction of the claw lever 200 (FIG. 9D). Thus, when the striker 2 is unlocked after releasing the first stage lock, the door may be easily opened by the elastic force of the elastic member 300, the user's opening force, and the reaction force of the weather strip 3.

As shown in FIG. 10, the latch apparatus for the door of the vehicle according to this embodiment may further include the stopper 500. Such a stopper 500 is formed to be selectively compressed by a central portion of the elastic member 300 that moves downwards, as the first end of the elastic member 300 is moved to the second position R2 and passes through the second zone B when the striker 2 is unlocked (see FIG. 9A).

More preferably, the stopper 500 may be formed of a material having elasticity to be compressed or released as it is pressed by the central portion of the elastic member 300. However, without being limited thereto, the stopper may be formed of a compression spring for performing the same function.

As shown in FIG. 10, the stopper 500 is selectively in close contact with the central portion of the elastic member 30 that moves downwards as the elastic member passes through the second zone B, while the first end of the elastic member 30 moves to the second position R2 by the rotation of the claw lever 200 when the door is opened. Thereby, it is possible to provide stronger resistance corresponding to a force that presses the stopper 500 with the claw lever 200 in the initial opening stage of the door.

As a result, as shown in FIG. 11, when the door is opened in the fourth stage, the elastic force of the elastic member 300 and the elastic force of the stopper 500 are further added, thus increasing the actuating force of the elastic member 300 when the striker 2 is switched to the unlock state, and thereby providing strong resistance in the initial opening stage of the door, and reducing the opening sound.

According to the present disclosure, when a two-way torsional spring is applied to a claw lever to increase resistance to a latch and a striker when a door is opened, and to reduce resistance when the door is closed, a first end of the torsional spring can move leftwards and rightwards in a slot of the claw lever, and can be elastically moved along a movement guide provided in the latch to adjust the elastic force of the torsional spring, thus increasing an elastic force acting in a direction opposite to the rotating direction of the claw lever in an initial opening stage of the door, and thereby reducing a door opening sound.

Further, according to the present disclosure, a torsional spring and a stopper made of a material such as rubber to support the torsional spring are provided, and the stopper is compressed as the position of the torsional spring is changed in an initial opening stage of a door, so resistance is increased by the rotation of the claw lever, thus suppressing a force for rotating the claw lever to unlock a striker with a stronger force.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A latch apparatus for a door of a vehicle, the latch apparatus comprising:

- a claw lever restrained by a pawl lever to lock a striker as the door is switched from an opened state to a close state, and released from the pawl lever to unlock the striker as the door is switched from the closed state to the open state; and
- an elastic member configured to adjust an elastic force provided to the claw lever, as the claw lever is rotated in a state where a first end of the elastic member is movably inserted into a slot formed in the claw lever; and
- a movement guide provided on a latch body to guide a moving path of the elastic member inserted therein,
- wherein the first end of the elastic member is inserted into the slot,
- wherein the first end of the elastic member moves from a first position to a second position in accordance with rotation of the claw lever to lock the striker, and
- wherein the first end of the elastic member moves from the second position to the first position in accordance with rotation of the claw lever to unlock the striker,
- wherein the movement guide comprises:
  - a first moving path configured to guide the elastic member to a maximum compression position, as the claw lever is rotated to lock or unlock the striker; and
  - a second moving path extending from the first moving path to define a circulation path, and guiding the first end of the elastic member from the first position to the second position when the claw lever rotates.

2. The latch apparatus of claim 1, wherein the elastic member provides an elastic force in a direction opposite to a rotating direction of the claw lever, as the door is switched from the closed state to the open state.

3. The latch apparatus of claim 1, wherein the elastic member adjusts intensity of the elastic force through rotation of the claw lever in a state where a second end of the elastic member is secured to the latch body to be spaced apart from the claw lever.

4. The latch apparatus of claim 1, wherein the second moving path comprises:

- a first zone configured to provide an elastic restoring force, in a direction where the claw lever is rotated, to the first end of the elastic member when the striker is locked;
- a second zone bent from the first zone, and moving the first end of the elastic member as the striker is switched from a second stage lock state to an unlock state, thus providing an additional elastic force to the elastic member; and
- a third zone extending from the second zone, guiding the movement of the first end of the elastic member to the maximum compression position when the striker is switched to the unlock state, and providing an elastic restoring force in a direction where the claw lever is rotated toward an initial position.

5. The latch apparatus of claim 4, wherein the first moving path guides the movement of the elastic member to the maximum compression position in a direction where the door is closed when the striker is locked, and guides the movement of the elastic member to the maximum compression position in a direction where the door is opened from a point where the third zone is completed when the striker is unlocked.

6. The latch apparatus of claim 5, wherein the elastic member provides the elastic force in the rotating direction of the claw lever at the maximum compression position when the striker is locked, thus causing the door to be in a first stage lock state, and continuously provides an elastic force in a direction where the door is closed, thus causing the door to be in a second stage lock state, as the elastic member leaves the maximum compression position of the first stage lock state.

7. The latch apparatus of claim 5, wherein the elastic member provides the elastic force in the rotating direction of the claw lever when the striker is unlocked, thus causing the door to be switched from the second stage lock state to the first stage lock state, and continuously provides an elastic force in a direction where the door is opened, as the elastic member leaves the maximum compression position of the first stage lock state.

8. The latch apparatus of claim 4, wherein the elastic member provides an elastic force in the direction where the door is closed when entering the first zone, and provides an elastic force in the direction where the door is opened when the third zone is completed.

9. The latch apparatus of claim 4, further comprising:

- a stopper formed to be selectively compressed by a central portion of the elastic member that moves downwards, as the first end of the elastic member is moved to the second position and passes through the second zone when the striker is unlocked.

10. The latch apparatus of claim 9, wherein the stopper is formed of a material having elasticity to be compressed or released as it is pressed by the central portion of the elastic member.

* * * * *